TRIGGER STEERING CIRCUIT ARRANGEMENT

Filed May 29, 1956 2 Sheets-Sheet 1

WALTER S. DRUZ
*INVENTOR.*

BY John J. Pederson

HIS ATTORNEY.

TRIGGER STEERING CIRCUIT ARRANGEMENT

Filed May 29, 1956 2 Sheets-Sheet 2

WALTER S. DRUZ
*INVENTOR.*

BY John J. Pederson

HIS ATTORNEY.

United States Patent Office 2,864,952

Patented Dec. 16, 1958

2,864,952

TRIGGER STEERING CIRCUIT ARRANGEMENT

Walter S. Druz, Bensenville, Ill., assignor to Zenith Radio Corporation, a corporation of Delaware Application May 29, 1956, Serial No. 588,016

10 Claims. (Cl. 250—27)

This invention pertains to a trigger-steering, isolation circuit arrangement for controlling or triggering the operation of a multi-stable actuating device. The circuit arrangement is particularly attrractive when incorporated in a subscription television receiver and for that reason is described in such an environment.

Typical prior trigger-steering networks for multi-stable actuating devices, such as ring counters or bi-stable multivibrators, comprise a network of unidirectional devices such as diodes to provide the essential isolation of the input circuits so that a trigger pulse applied to one input does not reach any other. This isolation is especially necessary when it is desired to actuate the multi-stable device to a predetermined one of its stable operating conditions, if it is not already there, with some pulses and to actuate the device from its instantaneous condition, whichever one that may be, to its alternate condition with other pulses. In order to achieve such a result with previous arrangements, the various input circuits of the multi-stable device must be coupled together and these interconnections must employ unidirectional devices for isolation purposes so that the pulses earmarked for a certain input for actuating the device to a predetermined condition are not applied to any other input circuit.

Such a typical prior art arrangement is shown, for example, in copending application Serial No. 326,107, filed December 15, 1952, and issued February 11, 1958, as Patent 2,823,252, in the name of Jack E. Bridges, and assigned to the present assignee, as incorporated in a subscription television system. In that system, an airborne coding signal is developed during each vertical- or field-retrace interval, and this signal contains a combination of signal bursts which individually have a predetermined identifying frequency. The signal bursts are preferably randomly sequenced and randomly appearing with each combination for more effective coding and are transmitted to subscriber receivers along with the video signal. After separating the various bursts from one another by means of suitable filters both at the transmitter and at various receivers they are applied to similar transposition or adjustable switching mechanisms. The mechanism at the transmitter and at each of the receivers selectively establishes a pattern of circuit connections, as determined by the particular adjustment of the mechanism, between a series of input circuits over which the bursts are conducted and three output circuits which lead to a multi-stable actuating device such as a conventional bi-stable multivibrator comprising the usual two cross-coupled triodes. One of the outputs of the transposition mechanism is connected through a diode to the control grid of one of the triodes so that the multivibrator is actuated to one of its two stable operating conditions in response to pulses applied from that output circuit, another output from the switching mechanism is connected through another diode to the control grid of the other triode in order to actuate the multivibrator to the other one of its two operating conditions in response to pulses applied over that circuit, and the third output circuit is connected through separate diodes to the control grid of each triode so that the multivibrator is actuated from its instantaneous or present condition to its other or alternate condition in response to pulses applied from that third output.

Accordingly, the bi-stable multivibrator is actuated in a prescribed sequence, shifting from one to the other of its two stable operating conditions as dictated by each combination of code signal bursts. The resulting amplitude changes in the output signal of the multivibrator are employed to operate a coder which itself has two stable operating conditions to establish either one of two operating modes in the system, each mode introducing a predetermined time relationship between the video and line-synchronizing components. Thus, upon the termination of each combination of bursts, namely upon the termination of each field-retrace interval, the coder is established in either one of two operating conditions to dictate the mode in which the system will operate for the immediately succeeding field-trace interval. In this manner the mode is changed during each field-retrace interval in an irregular or random fashion since the individual bursts appear at random within the combinations.

The present invention provides a novel and relatively inexpensive trigger-steering arrangement that may be used in conjunction with a multi-stable device, as in the Bridges system. Circuit economies are realized by employing a unique and yet simplified network of impedance elements to achieve the desired results without requiring any relatively expensive unidirectional devices.

It is, accordingly, an object of the present invention to provide an improved trigger-steering, isolation circuit arrangement for multi-stable actuating devices.

It is another object to provide a trigger-steering, isolation circuit arrangement which does not require relatively expensive unidirectional devices.

It is a further object of the present invention to provide an improved trigger-steering, isolation circuit arrangement which presents substantially the same impedance and time constant to each of the trigger impulses applied thereto.

A trigger-steering, isolation circuit arrangement in accordance with the invention is constructed for use with a multi-stable actuating device having a plurality of input circuits each of which responds to an applied pulse for establishing the device in an assigned one of its stable operating conditions. The circuit arrangement comprises a first signal source for producing pulse signals of a given amplitude and a first load circuit connected across the first source. A second signal source produces pulse signals having approximately the same given amplitude, and a second load circuit is connected across that second source. A bilaterally conductive impedance circuit is connected between one side of the first load circuit and one side of the second load circuit and is provided with an intermediate tap connected to one of the input circuits of the multi-stable device. Finally, the trigger-steering arrangement includes an additional bilaterally conductive impedance circuit connected in parallel with the second load circuit and is also provided with an intermediate tap connected to another one of the input circuits. With this arrangement, pulses applied to the first load circuit from the first source are impressed across the aforementioned one input circuit with a relatively high amplitude and across the other input circuit with a relatively low amplitude whereas pulses applied to the second load circuit from the second source are impressed across both of the input circuits with the same relatively high amplitude.

The features of this invention which are believed to be new are set forth with particularity in the appended claims. The invention, together with further objects and advantages thereof, may best be understood, however, by reference to the following description in conjunction with the accompanying drawings, in which:

Figure 1:
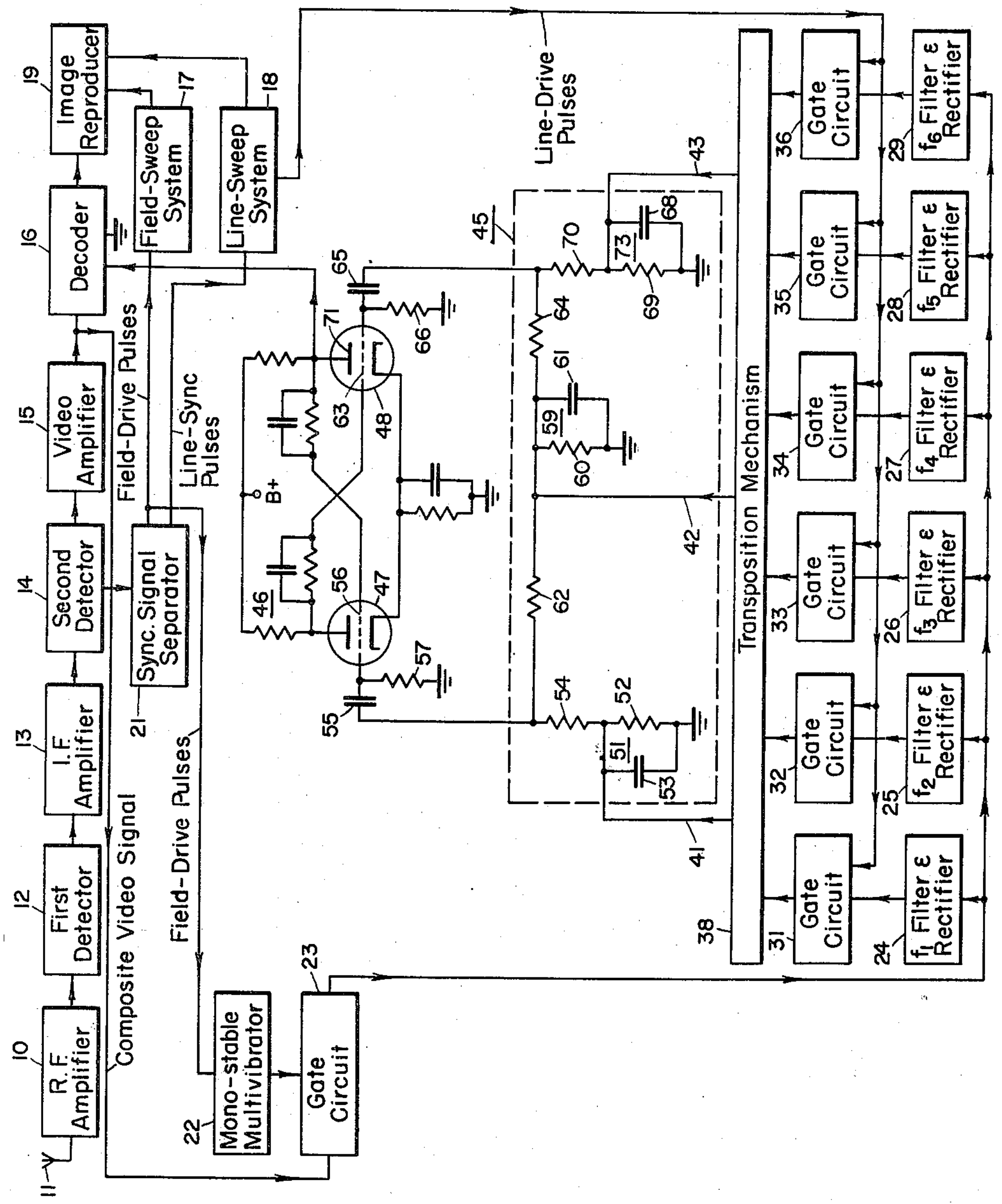
Figure 1 is a schematic diagram of a subscription television receiver including a trigger-steering, isolation circuit arrangement constructed in accordance with one embodiment of the invention.

The receiver of Figure 1 is constructed to utilize a telecast originating at a transmitter which is made in accordance with the aforementioned disclosure by Bridges. It comprises a radio-frequency amplifier 10 having input terminals connected to an antenna circuit 11 and output terminals connected to a first detector 12. This detector is coupled through an intermediate-frequency amplifier 13 to a second detector 14 which, in turn, is connected to the input circuit of a video amplifier 15. The output circuit of the video amplifier is coupled to an encoder in the form of a decoder 16 which, in turn, is connected to the input electrodes of a cathode-ray image-reproducing device 19. Since in most secrecy or subscription communication systems the coding and decoding apparatus are similar and may be used interchangeably, the term "encoder" is used herein in its generic sense to encompass either the coder at the transmitter or the decoder at the receiver.

Decoder 16 may be similar to that disclosed and claimed in copending application Serial No. 243,039, filed August 22, 1951, and issued August 7, 1956, as Patent 2,758,153, in the name of Robert Adler, and assigned to the present assignee. It may comprise a beam-deflection switching tube having a pair of output circuits which may be selectively connected into the video channel as the electron beam of the tube is deflected from one to the other of two beam-receiving anodes in synchronism with mode changes of the transmitted signal. It will be remembered from the previous description of the Bridges system that these mode changes, which occur during field-retrace intervals, take the form of variations in the timing of the video signal relative to the synchronizing signal of the received composite television signal. Consequently, the output circuit coupled to one anode of the switching tube includes a time-delay network while the other output connected to the other anodes does not. The timing variations are compensated, in order effectively to decode the television signal, as the beam of the deflection tube is switched between its anodes. This switching effect is accomplished by means of a beam-deflection-control or actuating signal applied to decoder 16 as explained hereinafter.

Second detector 14 is also coupled to a synchronizing-signal separator 21 which is coupled, in turn, to a field-sweep system 17 and to a line-sweep system 18. The output terminals of sweep systems 17 and 18 are connected respectively to field- and line-deflection elements (not shown) associated with image reproducer 19.

In an illustrated embodiment of the Bridges system, the air-borne coding signal comprises up to six bursts of six various signal frequencies, designated for convenience $f_1$–$f_6$, individually transmitted between the line-drive pulses superimposed on the vertical blanking pulse after the post equalizing pulses. The Bridges system also employs bursts of a seventh frequency which are applied directly to the encoding apparatus for reset purposes only. In order to simplify the explanation of the present invention, however, the seventh frequency and the reset function will be ignored.

To facilitate separating the six coding bursts, it is desirable to provide circuitry which gates in only that portion of the television signal containing such bursts. To that end, field-drive pulses are derived from synchronizing-signal separator 21 and supplied to a mono-stable multivibrator 22 having output terminals connected to one input circuit of a normally-closed gate circuit 23. The output circuit of video amplifier 15 is also coupled to another input circuit of gate 23 to supply the composite video signal thereto, and the output circuit of the gate is coupled to each one of a series of six filter and rectifier units 24–29. Each of these units responds to an assigned one of the six frequencies $f_1$–$f_6$ to separate the bursts from the composite video signal and also from one another.

The output terminals of filter-rectifier networks 24–29 are connected respectively to a series of gate circuits 31–36, each of these gates also being connected to the output of line-sweep system 18 to derive line-drive pulses therefrom. The output of each of the gate circuits is connected to an assigned input circuit of an adjustable transposition or switching mechanism 38. As far as the technique of coding is concerned, the transposition mechanism is provided merely for the purpose of selectively connecting any one of gate circuits 31–36 to any one of three output conductors 41–43. Decoding can be accomplished only if the various interconnections established by switching mechanism 38 are identical to the corresponding interconnections established by a similar transposition mechanism interposed between the source of burst signals and a bi-stable multivibrator in the coding apparatus at the transmitter. The necessary information for manually setting the transposition mechanism is disseminated only to authorized subscribers and a suitable charge may, of course, be assessed for such information. Suitable switching mechanisms which provide an adequate degree of security against unauthorized pirating or appropriation may be found, for example, in copending applications Serial No. 407,192, filed February 1, 1954, in the name of George V. Morris; Serial No. 419,-301, filed March 29, 1954, in the name of Jack E. Bridges; Serial No. 490,078, filed February 23, 1955, in the name of George V. Morris et al.; and Serial No. 555,541, filed December 27, 1955, in the name of Jack E. Bridges, all of which are assigned to the present assignee.

Output conductors 41–43 are connected through a trigger-steering, isolation circuit arrangement 45, which is constructed in accordance with the invention, to the input circuits of a multi-stable actuating device which takes the form of a conventional bi-stable multivibrator 46 comprising the usual two cross-coupled triodes 47, 48. Specifically, conductor 41 is connected to one side of a load circuit 51 comprising the parallel combination of a resistor 52 and a condenser 53, the other side of which is connected to ground. Conductor 41 is also connected to one side of a resistor 54, the other side of which is connected through a coupling condenser 55 to the control grid 56 of triode 47 of multivibrator 46. Grid 56 is connected to ground through a grid-leak return resistor 57. Output conductor 42 is connected to one side of a load circuit 59 which includes the parallel combination of a resistor 60 and a condenser 61, the other side being connected to ground. Conductor 42 is also connected to the junction of resistor 54 and condenser 55 through a resistor 62 and is connected to control grid 63 of triode 48 through a resistor 64 and a coupling condenser 65. Grid 63 is also connected to ground through a grid-leak return resistor 66. The output conductor 43 is connected to one side of a load circuit 73 comprising another parallel combination of a condenser 68 and a resistor 69, the other side of which load is connected to ground. Conductor 43 is also connected to the junction of resistor 64 and condenser 65 through a resistor 70.

It will be explained in detail later that pulses applied over conductor 41 are impressed on grid 56 to actuate multivibrator 46 to one of its operating conditions, pulses applied over conductor 42 are impressed on both grids 56 and 63 to flip multivibrator 46 fom either present condition to its other condition, and pulses applied over conductor 43 reach control grid 63 to trigger the multivibrator to its other condition. Anode 71 of triode 48 is connected to one deflection-control element of decoder 16, the other of which is connected to ground to provide an actuating or deflection-control signal therefor which has an amplitude excursion each time the multivibrator changes from one operating condition to the next.

Inasmuch as a complete description of the coding technique is included in the copending Bridges application, Serial No. 326,107, and since the coding technique itself forms no part of the present invention, the operation of the complete receiver will be described only briefly, disregarding for the moment the detailed operation of trigger-steering, isolation network 45. The coded television signal is intercepted by antenna 11, amplified in radio-frequency amplifier 10, heterodyned to the selected intermediate frequency in first detector 12, amplified in intermediate-frequency amplifier 13 and detected in second detector 14 to produce a coded composite video signal. This signal is amplified in video amplifier 15, translated through decoder 16 and impressed on the input electrodes of image-reproducing device 19 to control the intensity of the electron beam of the device in well known manner.

The synchronizing components are separated in separator 21, the field-synchronizing pulses being utilized to synchronize the operation of sweep system 17 and consequently the vertical-deflection signal supplied to the field-deflection elements of reproducer 19, whereas the line-synchronizing pulses are utilized to synchronize sweep system 18 and therefore the horizontal-deflection signal supplied to the horizontal-deflection elements in the image reproducer. The sound-modulated carrier wave normally received along with the video carrier is detected and reproduced in an audio system which has been omitted from the drawing for purposes of simplicity.

Field-drive pulses from separator 21 are supplied to mono-stable multivibrator 22 to produce a gating pulse for normally-closed gate circuit 23. The parameters of the multivibrator are so chosen that the gating pulse overlaps in point of time that portion of the field-retrace interval of the composite video signal which includes the signal bursts constituting the coding signal. The composite video signal from amplifier 15 is continuously applied to the input circuit of gate 23, but only the information contained during the interval of the gating pulse developed in multivibrator 22 is translated to filter and rectifier units 24–29. Gate 23 is thus open during the times the signal bursts of six various frequencies representing the code schedule of the program are received, and since the filter and rectifier units are individually tuned to an assigned one of the six frequencies $f_1$–$f_6$ such bursts are separated out from the composite video signal and from each other. Each time a code burst occurs in the coding signal it is accepted by one of units 24–29, rectified and applied to one of gate circuits 31–36 to serve as a gating signal to gate in the line-drive pulse occurring in time coincidence with the rectified envelope. Consequently, line-drive pulses which are gated in by the coding bursts are channeled from gate circuits 31–36 through switching mechanism 38 to selected ones of conductors 41–43 in order to effect operation of bi-stable multivibrator 46.

The coding apparatus at the transmitter comprises an identical arrangement of a bi-stable multivibrator connected to a series of air-code signal burst rectifiers through gate circuits and a transposition mechanism so that if the transposition mechanism of the receiver is adjusted to the same setting as the corresponding switching mechanism at the transmitter, the input circuits of bi-stable actuating device 46 receive pulses similar to those received by the input circuits of the corresponding bi-stable actuating device at the transmitter. Multivibrator 46 therefore produces a rectangularly shaped actuating or deflection-control signal for decoder 16 which is identical in wave form to that developed at the transmitter for coding the television signal initially. It undergoes amplitude excursions each time the multivibrator is triggered from one of its operating conditions to the other. Decoder 16 consequently operates in synchronism with the coder at the transmitter so that the video signal applied to the input circuit of image-reproducing device 19 is suitably compensated to effect intelligible image reproduction.

Figure 2:
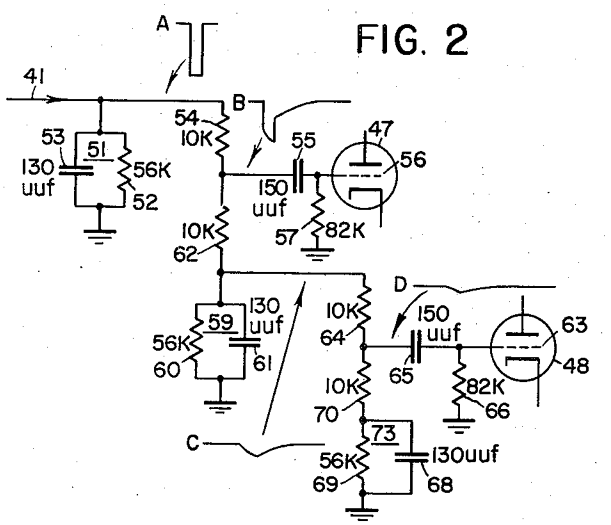
Figure 2 is a schematic representation of a portion of the trigger-steering arrangement of Figure 1 redrawn for convenience of illustration.

In considering the detailed operation of trigger-steering circuit arrangement 45 in accordance with the invention, reference is made to Figure 2 wherein the circuit is redrawn in order to simplify the explanation. Each one of conductors 41–43 is connected to the output of one or more of gate circuits 31–36, depending on the particular instantaneous setting of transposition mechanism 38, in order to receive trigger pulses for ultimate application to multivibrator 46. However, the pulses applied over conductors 41 and 43 must be impressed with an effective amplitude on only control grids 56 and 63, respectively. Figure 2 demonstrates how a pulse applied over conductor 41 is impressed on grid 56 but not on grid 63. Of course, the same explanation applies in showing how pulses applied over conductor 43 reach grid 63 but not grid 56.

In Figure 2 it is seen that the line-drive pulse supplied from one of the gate circuits, which constitutes a signal source, is applied across load 51 with negative polarity as shown by wave form A. Such a pulse is square topped and sharply defined, and in one proven circuit arrangement actually constructed the pulse had a duration of approximately two micro-seconds. The entire amplitude of pulse A is applied to the series circuit comprising resistors 54 and 62 and load 59, but because of the voltage dividing action only a portion thereof appears on grid 56. With the various components having the circuit parameters or values as shown, the pulse developed across the multivibrator input circuit comprising condenser 55 and resistor 57 has a wave shape as shown by curve B. The series circuit comprising resistors 54 and 62 and load 59 collectively exhibit a time constant approximately equal to the pulse duration, namely two micro-seconds. Thus, at the instant of the very leading edge of the applied pulse of curve A there is no voltage drop across load 59 and therefore the instantaneous potential of the leading edge of the pulse of curve B is equal to one half of the amplitude of the pulse of curve A, since the impedance of load 59 is zero and the resistance of resistor 62 is equal to that of resistor 54. During the two micro-second interval of pulse A, condenser 61 charges up in exponential fashion to about ¼ of the applied pulse amplitude and then decays back to zero in about four time constants, as shown by wave form C which appears at the junction of load 59 and resistor 62. Consequently, during the two micro-second interval the voltage building up on condenser 61 adds to the potential appearing at the junction of resistors 54 and 62 so that the peak amplitude of pulse B at the termination of applied pulse A is approximately ¾ that of pulse A.

Pulse B is effective to render triode 47 non-conductive if it is already conducting because of the relatively fast rise time of its leading edge to ½ the amplitude of the pulse of curve A. It will be remembered that in the triggering of any multivibrator it is essential for the triggering pulse to have a fast rise time in order to initiate the required loop regeneration.

Meanwhile, pulse C which only reaches an amplitude of ¼ that of pulse A is further divided through the voltage dividing arrangement of resistors 64, 70 and load 73. The circuit values are similar to those employed for resistors 54, 62 and load 59 and thus the voltage of pulse C is further decreased so that the maximum potential of the pulse developed at the junction of resistors 64 and 70 is only $\frac{3}{16}$ that of pulse A as shown by curve D. Because of the integrating action of condenser 68 this pulse has a decay time of approximately eight time constants and the leading edge is saw-tooth shaped. Such a pulse is applied to grid 63 but it has neither the amplitude nor fast rise time of its leading edge required to effect triggering of triode 48.

It should now be appreciated that if the time constant of the series arrangement of resistors 54, 62 and load 59 is substantially smaller than the time duration of Pulse A, condenser 61 would charge quite rapidly to produce a negative pulse having a shape which would be sufficient to render triode 48 non-conductive. Thus, when a pulse like pulse A is applied to load 51 it is translated to the input circuit comprising condenser 55 and resistor 57 with a relatively high amplitude and a relatively fast rise time to actuate triode 47, but the same pulse A after being divided on a voltage basis and integrated due to the condensers present has a relatively low amplitude and relatively slow rise time when applied to grid 63. Tube 48 is thus unaffected by a pulse applied over conductor 41. Of course, as mentioned before, the same reasoning may be applied in explaining why pulses applied over conductor 43 reach grid 63 with a relatively high amplitude but are impressed on grid 56 with a negligible amplitude.

Figure 3:
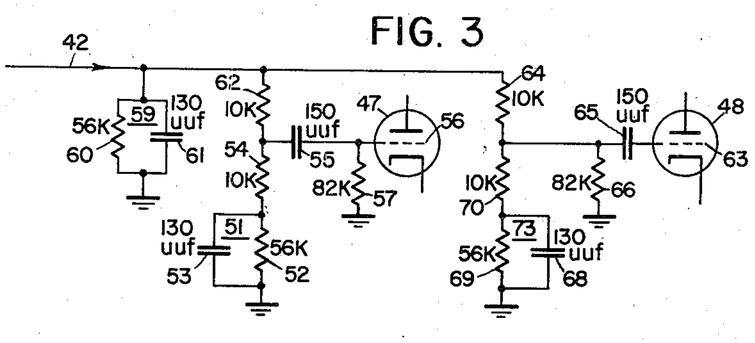
Figure 3 is a schematic diagram of the same portion of Figure 1 shown in Figure 2 and is further redrawn for illustrative purposes.

In explaining the operation of the trigger-steering network when a pulse is applied over conductor 42, attention is directed to Figure 3. There the same circuit of Figure 2 has been redrawn in order to demonstrate how a pulse, like that shown in wave form A, when applied on conductor 42 divides in the same manner across a series circuit comprising resistors 62, 54 and load 51 and also across a series circuit comprising resistors 64, 70 and load 73 to provide the same pulse as shown in wave form B on both grid 56 and 63. Consequently, no matter what condition multivibrator 46 finds itself at the time, any pulse applied over conductor 42 is impressed across the input circuit of the conducting triode, whichever one that may be, to cut that triode off and therefore flip the multivibrator to its alternate condition.

From Figures 2 and 3 it should be apparent that the circuit coupled to each one of conductors 41–43 has substantially the same time constant and the same impedance. This is particularly advantageous in the illustrated environment of the invention since the various signal sources (namely, gate circuits 31–36) coupled to conductors 41–43 are not assigned in any fixed way. To elucidate, for one adjustment of mechanism 38 certain ones of the gate circuits will be connected to conductors 41–43 in accordance with one interconnection pattern, whereas for another adjustment a completely different pattern is established between the gates and the conductors. Thus, since each one of the load circuits 51, 59 and 73 presents the same impedance it does not make any difference which gate circuit is connected to which load; no impedance matching is necessary.

Figure 4:
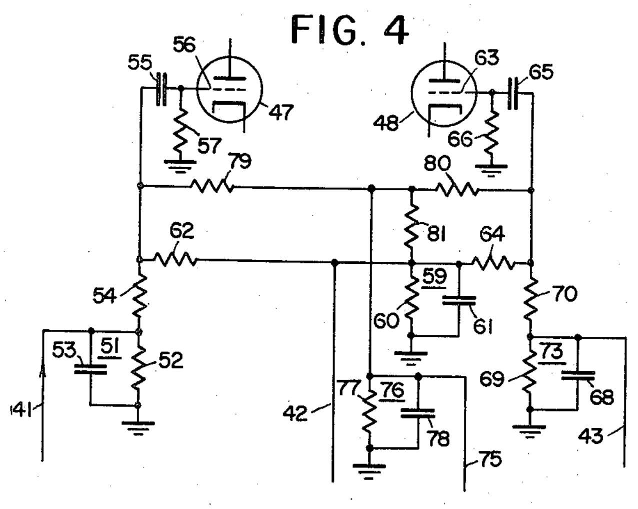
Figure 4 shows a part of the circuit diagram of Figure 1 which has been modified in accordance with another embodiment of the invention.

Figure 4 shows another embodiment of the invention wherein a fourth signal source, namely another one of gate circuits 31–36, may be connected to still another input conductor of the trigger-steering arrangement. Essentially, the circuit of Figure 4 is similar to that shown in Figure 1 as indicated by the identical reference numerals employed, but there is an addition of one more input conductor 75 that may be connected to switching mechanism 38 and ultimately to the output of one of the gate circuits in order to derive gated-in line-drive pulses. Conductor 75 is connected to one side of a load circuit 76 comprising the parallel combination of a resistor 77 and a condenser 78, the other side of which combination is grounded. Conductor 75 is also connected to the vertex of a T network comprising resistors 79, 80 and 81. The other end of resistor 79 is connected to the junction of condenser 55 and resistors 54 and 62; the other side of resistor 80 is connected to the junction of condenser 65 and resistors 64 and 70; and the other end of resistor 81 is connected to the junction of load 59 and resistors 62 and 64.

With this arrangement, it may be demonstrated with similar redrawn representations such as are shown in Figures 2 and 3 that pulses applied over conductors 41–43 operate the multivibrator in exactly the same fashion as explained hereinbefore and, further, pulses applied over the additional conductor 75 effect the operation of multivibrator 46 in a manner identical to that when pulses are applied over conductor 42. Moreover, the circuit parameters may be adjusted so that each of input conductors 41–43 and 75 is connected to a circuit which exhibits the same time constant and has the same impedance. Additionally, if it is desired for some reason or other to match input conductor 75 to a different impedance, resistors 79–81, 60, 62 and 64 may be adjusted accordingly to achieve such a result and this will not disturb the operation of the remaining circuit arrangement.

By way of summary, the invention provides a trigger-steering, isolation circuit arrangement 45 for a multi-stable actuating device 46 having a plurality of input circuits (condenser 55 and resistor 57 constituting one input circuit and condenser 65 and resistor 66 constituting another input circuit) each of which responds to an applied pulse for establishing device 46 in an assigned one of its two stable operating conditions. The particular one of gate circuits 31–36 which happens to be connected to conductor 41, which is determined by the instantaneous switch setting of mechanism 38, constitutes a first signal source for producing pulse signals of a given amplitude, namely pulses like that shown in wave form A. Load circuit 51 is connected across this first source. The particular gate circuit connected to conductor 42 through mechanism 38 constitutes a second signal source for producing pulse signals having approximately the same given amplitude as that applied to conductor 41. Load circuit 59 is connected across this second source. Resistors 54 and 62 may be considered a bilaterally conductive impedance circuit connected between one side of load circuit 51 and one side of load circuit 59, and this bilaterally conductive circuit is provided with an intermediate tap (namely at the junction of resistors 54 and 62) connected to one of the input circuits of multivibrator 46, namely to the input circuit comprising condenser 55 and resistor 57. Resistors 64, 70 and load 73 constitute an additional bilaterally conductive impedance circuit connected in parallel with load 59 and provided with an intermediate tap (junction between resistors 64 and 70) connected to another one of the input circuits, namely to the input circuit comprising condenser 65 and resistor 66. With such a trigger-steering network, pulses like that shown in wave form A applied to load circuit 51 from the gate circuit connected thereto are impressed across the input circuit comprising condenser 55 and resistor 57 with a relatively high amplitude as shown by wave form B and across the input circuit comprising condenser 65 and resistor 66 with a relatively low amplitude as shown by wave form D, whereas pulses like that shown in curve A applied to load circuit 59 from the gate connected thereto are impressed across both input circuits of the multivibrator with the same relatively high amplitude as shown by wave form B.

While particular embodiments of the invention have been shown and described, modifications may be made, and it is intended in the appended claims to cover all such modifications as may fall within the true spirit and scope of the invention.

I claim:

1. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing pulse signals of a given amplitude; a first load circuit connected across said first source; a second signal source for producing pulse signals having approximately said same given amplitude; a second load circuit connected across said second source; a bilaterally conductive impedance circuit connected between one side of said first load circuit and one side of said second load circuit and provided with an intermediate tap connected to one of said input circuits of said device; and an additional bilaterally conductive impedance circuit connected in parallel with said second load circuit and provided with an intermediate tap connected to another one of said input circuits, whereby pulses applied to said first load circuit from said first source are impressed across said one input circuit with a relatively high amplitude and across said other input circuit with a relatively low amplitude whereas pulses applied to said second load circuit from said second source are impressed across both said one and said other input circuit with said same relatively high amplitude.

2. A trigger-steering, isolation circuit arrangement for a bi-stable actuating device having two input circuits each of which responds to an applied pulse for establishing said device in an assigned one of its two stable operating conditions, said circuit arrangement comprising: a first signal source for producing pulse signals of a given amplitude; a first load circuit connected across said first source; a second signal source for producing pulse signals having approximately said same given amplitude; a second load circuit connected across said second source; a bilaterally conductive resistive circuit connected between one side of said first load circuit and one side of said second load circuit and provided with an intermediate tap connected to one of said input circuits of said device; and an additional bilaterally conductive impedance circuit connected in parallel with said second load circuit and provided with an intermediate tap connected to the other one of said input circuits, whereby pulses applied to said first load circuit from said first source are impressed across said one input circuit with a relatively high amplitude and across said other input circuit with a relatively low amplitude whereas pulses applied to said second load circuit from said second source are impressed across both said one and said other input circuit with said same relatively high amplitude.

3. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing pulse signals of a given amplitude and a predetermined time duration; a first load circuit connected across said first source; a second signal source for producing pulse signals having approximately said same given amplitude and said predetermined time duration; a second load circuit connected across said second source; a bilaterally conductive impedance circuit connected between one side of said first load circuit and one side of said second load circuit and provided with an intermediate tap connected to one of said input circuits of said device, said impedance circuit and said second load circuit collectively exhibiting a time constant at least as long as said predetermined time duration; and an additional bilaterally conductive impedance circuit connected in parallel with said second load circuit and provided with an intermediate tap connected to another one of said input circuits, said additional impedance circuit exhibiting a time constant at least as long as said predetermined time duration, whereby pulses applied to said first load circuit from said first source are impressed across said one input circuit with a relatively high amplitude and across said other input circuit with a relatively low amplitude whereas pulses applied to said second load circuit from said second source are impressed across both said one and said other input circuit with said same relatively high amplitude.

4. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing pulse signals of a given amplitude; a first load circuit including a parallel resistor-condenser combination connected across said first source; a second signal source for producing pulse signals having approximately said same given amplitude; a second load circuit including a parallel resistor-condenser combination connected across said second source; a bilaterally conductive impedance circuit connected between one side of said first load circuit and one side of said second load circuit and provided with an intermediate tap connected to one of said input circuits of said device; and an additional bilaterally conductive impedance circuit connected in parallel with said second load circuit and provided with an intermediate tap connected to another one of said input circuits to establish substantially equal time constants across each of said first and second load circuits, whereby pulses applied to said first load circuit from said first source are impressed across said one input circuit with a relatively high amplitude and across said other input circuit with a relatively low amplitude whereas pulses applied to said second load circuit from said second source are impressed across both said one and said other input circuit with said same relatively high amplitude.

5. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing pulse signals of a given amplitude; a first load circuit connected across said first source; a second signal source for producing pulse signals having approximately said same given amplitude; a second load circuit connected across said second source; a bilaterally conductive impedance circuit connected between one side of said first load circuit and one side of said second load circuit and provided with an intermediate tap connected to one of said input circuits of said device; and an additional bilaterally conductive impedance circuit connected in parallel with said second load circuit and provided with an intermediate tap connected to another one of said input circuits to present substantially the same impedance across each of said first and second load circuits, whereby pulses applied to said first load circuit from said first source are impressed across said one input circuit with a relatively high amplitude and across said other input circuit with a relatively low amplitude whereas pulses applied to said second load circuit from said second source are impressed across both said one and said other input circuit with said same relatively high amplitude.

6. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing sharply defined, square-topped pulse signals of a given amplitude; a first load circuit connected across said first source; a second signal source for producing pulse signals having approximately the same amplitude and shape as the pulse signals developed in said first source; a second load circuit connected across said second source; a bilaterally conductive impedance circuit connected between one side of said first load circuit and one side of said second load circuit and provided with an intermediate tap connected to one of said input circuits of said device; and an additional bilaterally conductive impedance circuit connected in parallel with said second load circuit and provided with an intermediate tap connected to another one of said input circuits, whereby pulses applied to said first load circuit from said first source are impressed across said one input circuit with a relatively high amplitude and with a relatively fast rise time and across said other input circuit with a relatively low amplitude and with a relatively slow rise time whereas pulses applied to said second load circuit from said second source are impressed across both said one and said other input circuit with said same relatively high amplitude and said relatively fast rise time.

7. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing pulse signals of a given amplitude; a first load circuit connected across said first source; a second signal source for producing pulse signals having approximately said same given amplitude; a second load circuit connected across said second source; a bilaterally conductive impedance circuit connected between one side of said first load circuit and one side of said second load circuit and provided with an intermediate tap connected to one of said input circuits of said device; a third signal source for producing pulse signals having approximately said same given amplitude; a third load circuit connected across said third source; and another bilaterally conductive impedance circuit connected between one side of said second load circuit and one side of said third load circuit and provided with an intermediate tap connected to another one of said input circuits, whereby pulses applied to said first load circuit from said first source are impressed across said one input circuit with a relatively high amplitude and across said other input circuit with a relatively low amplitude, whereas pulses applied to said second load circuit from said second source are impressed across both said input circuits with said same relatively high amplitude, and pulses applied to said third load circuit from said third source are impressed across said other input circuit with said same relatively high amplitude and across said one input circuit with said same relatively low amplitude.

8. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing pulse signals of a given amplitude and a predetermined time duration; a first load circuit connected across said first source; a second signal source for producing pulse signals having approximately said same given amplitude and said predetermined time duration; a second load circuit connected across said second source; a bilaterally conductive impedance circuit connected between one side of said first load circuit and one side of said second load circuit and provided with an intermediate tap connected to one of said input circuits of said device, said impedance circuit and said second load circuit collectively exhibiting a time constant at least as long as said predetermined time duration; a third signal source for producing pulse signals having approximately said same given amplitude and said predetermined time duration; a third load circuit coupled across said third source; and another bilaterally conductive impedance circuit connected between one side of said second load circuit and one side of said third load circuit and provided with an intermediate tap connected to another one of said input circuits, said other impedance circuit and said third load circuit collectively exhibiting a time constant at least as long as said predetermined time duration, whereby pulses applied to said first load circuit from said first source are impressed across said one input circuit with a relatively high amplitude and across said other input circuit with a relatively low amplitude, whereas pulses applied to said second load circuit from said second source are impressed across both said input circuits with said same relatively high amplitude, and pulses applied to said third load circuit from said third source are impressed across said other input circuit with said same relatively high amplitude and across said one input circuit with said same relatively low amplitude.

9. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing sharply defined, square-topped pulse signals of a given amplitude; a first load circuit including a parallel resistor-condensor combination connected across said first source; a second signal source for producing sharply defined, square-topped pulse signals having approximately the same amplitude and shape as the pulse signals developed in said first source; a second load circuit including a parallel resistor-condenser combination connected across said second source, a bilaterally conductive resistive circuit connected between one side of said first load circuit and one side of said second load circuit and provided with an intermediate tap connected to one of said inputs of said device; a third signal source for producing sharply defined, square-topped pulse signals having approximately the same amplitude and shape as the pulse signals developed in said first source; a third load circuit including a parallel resistor-condenser combination connected across said third source; and another bilaterally conductive resistive circuit connected between one side of said second load circuit and one side of said third load circuit and provided with an intermediate tap connected to another one of said input circuits to establish substantially equal time constants across each of said first, second and third load circuits, whereby pulses applied to said first load circuit from said first source are impressed across said one input circuit with a relatively high amplitude and with a relatively fast rise time and across said other input circuit with a relatively low amplitude and with a relatively slow rise time, whereas pulses applied to said second load circuit from said second source are impressed across both said one and said other input circuit with said same relatively high amplitude and said fast rise time, and pulses applied to said third load circuit from said third source are impressed across said other input circuit with said same relatively high amplitude and said fast rise time and across said one input circuit with said same relatively low amplitude and said slow rise time.

10. A trigger-steering, isolation circuit arrangement for a multi-stable actuating device having a plurality of input circuits each of which responds to an applied pulse for establishing said device in an assigned one of its stable operating conditions, said circuit arrangement comprising: a first signal source for producing pulse signals of a given amplitude; a first load circuit connected across said first source; a second signal source for producing pulse signals having approximately said same given amplitude; a second load circuit connected across said second source; a bilaterally conductive impedance circuit connected between one side of said first load circuit and one side of said second load circuit and provided with an intermediate tap connected to one of said input circuits of said device; a third signal source for producing pulse signals having approximately said same given amplitude; a third load circuit connected across said third source; another bilaterally conductive impedance circuit connected between one side of said second load circuit and one side of said third load circuit and provided with an intermediate tap connected to another one of said input circuits; a fourth signal source for producing pulse signals having approximately said same given amplitude; a fourth load circuit connected across said fourth source;

and a further bilaterally conductive impedance circuit connected to said one input circuit, to said other input circuit and to said second load circuit, whereby pulses applied to said first load circuit from said first source are impressed across said one input circuit with a relatively high amplitude and across said other input circuit with a relatively low amplitude, whereas pulses applied to said second load circuit from said second source are impressed across both said one and said other input circuit with said same relatively high amplitude, pulses applied to said third load circuit from said third source are impressed across said other input circuit with said same relatively high amplitude and across said one input circuit with said same relatively low amplitude, and pulses applied to said fourth load circuit from said fourth source are impressed across both said one and said other input circuit with said same relatively high amplitude.

References Cited in the file of this patent

UNITED STATES PATENTS

| | | |
|---|---|---|
| 2,645,713 | Pritchard | July 14, 1953 |
| 2,685,643 | Fisk et al. | Aug. 3, 1954 |